United States Patent [19]
Fukui et al.

[11] Patent Number: 5,455,687
[45] Date of Patent: Oct. 3, 1995

[54] METHOD FOR TRANSFERRING DATA BETWEEN ELECTRONIC FILING SYSTEMS USING FACSIMILE COMMUNICATIONS PROTOCOL

[75] Inventors: Katsuhiko Fukui, Hiratsuka; Satoshi Ito; Kenji Machida, both of Odawara, all of Japan

[73] Assignee: Hitachi, Ltd., Tokyo, Japan

[21] Appl. No.: 926,107

[22] Filed: Aug. 5, 1992

[30] Foreign Application Priority Data

Aug. 6, 1991 [JP] Japan .................. 3-196873

[51] Int. Cl.⁶ .................................................. H04N 1/00
[52] U.S. Cl. .................... 358/438; 358/434; 358/435; 358/436; 358/403
[58] Field of Search ................... 358/434, 435, 358/436, 437, 438, 439, 440, 402, 403, 444, 404; 379/100; 364/240.8; 395/200

[56] References Cited

U.S. PATENT DOCUMENTS

| | | | |
|---|---|---|---|
| 4,680,776 | 7/1987 | Amundson | 375/8 |
| 4,893,333 | 1/1990 | Baran et al. | 358/468 |
| 4,907,094 | 3/1990 | Mishima et al. | 358/437 |
| 4,974,254 | 11/1990 | Perine et al. | 358/435 |
| 5,065,254 | 11/1991 | Hishida | 358/440 |
| 5,068,888 | 11/1991 | Scherk et al. | 379/100 |
| 5,099,340 | 3/1992 | Kamada | 358/434 |
| 5,159,443 | 10/1992 | Ando | 358/75 |

FOREIGN PATENT DOCUMENTS

| | | |
|---|---|---|
| 63-290451 | 11/1988 | Japan . |
| 245775 | 9/1992 | Japan . |
| 14175 | 1/1994 | Japan . |

*Primary Examiner*—Scott A. Rogers
*Assistant Examiner*—Thomas L. Stoll
*Attorney, Agent, or Firm*—Pennie & Edmonds

[57] ABSTRACT

A method for transferring data between electronic filing systems via a communications network and using facsimile communications protocol is disclosed. The method includes the step of adding codes corresponding to non-standardized terminal capability information into a session start command (CSS) of a facsimile communication protocol and sending the CSS to a receiving end electronic filing system. The non-standardized terminal capability information includes a code indicating that the sending system is an electronic filing system and the memory capacity of the sending system, etc.

The method further includes the step of adding header information at the top of the communication data to be transmitted. The header information includes an identifier identifying whether or not the data to be transmitted corresponds to an image; if it corresponds to an image, the header information further includes the size and line density of the image, the compression method for the image, etc. In the receiving end electronic filing system, the header information is decoded and the receiving end electronic filing system is controlled to properly reconstruct the received information in accordance with the decoded header information. This method makes it possible to transmit specific images such as large size images or color image and code information, which otherwise cannot be transferred with facsimile communications protocol.

25 Claims, 8 Drawing Sheets

| | |
|---|---|
| COUNTRY CODE | OCTET 1 |
| DOMESTIC COMMON CODE | OCTET 2 |
| SUPPLIER CODE (MSBs) | OCTET 3 |
| SUPPLIER CODE (LSBs) | OCTET 4 |
| SUPPLIER SUBCODE | OCTET 5 |
| PRODUCT CALASSIFICATION | OCTET 6 |
| APPLICATION CODE (MSBs) | OCTET 7 |
| APPLICATION CODE (LSBs) | OCTET 8 |
| CONTROL INFORMATION | OCTET 9 ⁠〜 |

{
MEMORY CAPACITY
IMAGE SIZE CAPABLE OF BEING HANDLED
OPTICAL DISK CAPACITY
SYSTEM CONSTITUTION
DEVICE INFORMATION
SYSTEM REVISION, ETC.
}

METHOD FOR TRANSFERRING DATA BETWEEN ELECTRONIC FILING SYSTEMS USING FACSIMILE COMMUNICATIONS PROTOCOL

BACKGROUND OF THE INVENTION

The present invention relates to transmitting and receiving data between electronic filing systems by means of facsimile over a public network. More particularly, this invention relates to a method for determining whether a receiving end system is a conventional facsimile or an electronic filing system capable of receiving facsimile as well as data other than facsimile type data such as code data, and to change the control of the sending end electronic filing system accordingly.

Japanese Patent Laid-Open Publication (KOKAI) No. 63-290451 discloses a conventional remote document filing system in which a facsimile apparatus is connected to one end of the telephone network while a document filing control apparatus is connected to the other end. The facsimile apparatus includes an input device for inputting service information and a transmission device for transmitting the inputted service information. The document filing control apparatus includes a receiving device for receiving the service information transmitted from the facsimile apparatus and a processing device for processing various types of document files based upon the transmitted service information. In this conventional system, the service information is transmitted from the facsimile to the document filing control apparatus prior to the execution of facsimile communication protocol (CCITT recommendation T.30) therebetween.

Incidentally, large-sized images, color images, and code information cannot be transmitted with any existing facsimile communication protocol, though they can be handled in an electronic filing system.

In the prior techniques as described above, a sending end system can only recognize that the receiving end system is a facsimile. Accordingly, large-sized images, color images, code information or the like cannot be transmitted or received even between electronic filing systems owing to the restrictions of facsimile communication protocol.

It is therefore an object of the present invention to provide a method for an electronic filing system to check to see if the destination system connected via the public network therewith is an electric filing system or a facsimile, and if the destination system is an electronic filing system, to control the processing of the source electronic filing system.

Another object of the present invention is to provide a method which enables the transferring of data which otherwise cannot be transmitted owing to the restrictions of the facsimile communication protocol even between the electronic filing systems having similar functions. Such data includes large-size images, color images, code information or the like, which are handed in an electronic filing system.

Still another object of the present invention is to provide a method which enables the destination system to be notified of the constitution of the sending end electronic filing system and the control information such as the treatable image size and the optical disk capacity together with the fact that the sending end system is an electronic filing system.

SUMMARY OF THE INVENTION

According to the first aspect of the present invention, there is provided a method for transferring data between electronic filing apparatuses via a public network which comprises the steps of adding header information at the head of communication data and transmitting the communication data together with the header information according to a facsimile communication protocol from a sending end electronic filing system to a receiving end electronic filing system via the public network, and decoding the header information added at the head of the communication data in the receiving end electronic filing system.

Default values of the parameters permissible in the facsimile communication protocol are used as parameters of an image to be transmitted irrespective of parameters of the actual image to be transmitted.

Preferably, the header information includes an identifier identifying the communication data to be either image information or code information; an image is reproduced based upon the communication data received by the receiving end electronic filing system only when the identifier represents the image information.

The head information includes, in addition to the identifier, at least one of the following: a classification of the code information, the code classification of the code information, a classification of the image information, the image size, the line density of the image, or a compression method of the image.

The data is transmitted in a page-by-page manner with a single page having a predetermined fixed capacity, and the header information is added at the head of the communication data for each page.

Preferably, facsimile communication protocol T. 62 bis is used as the facsimile communication protocol, and the information indicating that one end system is an electronic filing system is transmitted to other end system, using an area in which non-standardized terminal capability information is set in the T. 62 bis facsimile communication protocol. In such a case the nonstandardized terminal capability information is transmitted from one end electronic filing system to another end system prior to the transmission of communication data to determine whether or not the other end system is an electronic filing system on the basis of non-standardized terminal capability information sent back from the other end system. If the non-standardized terminal capability information is not sent back from the other end system, the other end system is thus determined not to be an electronic filing system.

It is also possible that the sending end electronic filing system notifies the receiving end system that the sending end system is an electronic filing system by using an user information area; whether or not the receiving end system is an electronic filing system is determined on the basis of whether a response indicating that the other end system is an electronic filing system is sent back from the receiving end system using the user information area.

According to the second aspect of the present invention, there is provided an electronic filing system including an optical disk for storing image therein, which comprises a transmission device for transmitting data retrieved from the optical disk via a public network according to facsimile communication protocols, a registering device for registering into the optical disk data received according to the facsimile communication protocols via the public network, a notifying device for notifying a receiving end system that a sending end system is an electronic filing system, and a switching device for switching control of the electronic filing system in accordance with a response received from the receiving end system indicating whether or not the receiving end system is an electronic filing system.

The notifying device uses facsimile communication protocol T. 62 bis as a facsimile communication protocol to notify the receiving end system that the sending end system is an electronic filing system. More specifically, it uses in T. 62 bis facsimile communications protocol an area in which non-standardized terminal capability information is set. Alternatively, the notifying device notifies the receiving end system that the sending end system is an electronic filing system using an user information area.

Preferably, the transmission performs the functions adding header information including an identifier identifying whether the transmission data is image information or code information to the head of the transmission data, and controlling the electronic filing system to switch with respect to the transmission data according to the header information sent back from the receiving end electronic filing system.

According to a third aspect of the present invention, there is provided a remote registering system comprising a plurality of electronic filing systems, in which image information and code information are transferred between the plurality of electronic filing systems interconnected to one another via the public network, thereby enabling one electronic filing system to register and retrieve data into and from another electronic filing system.

As mentioned above, in a data transmission according to the existing facsimile communication protocol, it is impossible to transfer code information, and the size and precision of the image to be transferred are limited. Accordingly, even in the communication between the electronic filing systems each having a facsimile transmitting/receiving function, the content capable of being transferred via the public network according to the existing facsimile communication network was limited.

The present invention has solved the above problem by employing a control mode peculiar to the electronic filing system for communication between the electronic filing systems while using the existing facsimile communication protocol in the following manner: default values (A4 size, 200 dpi image, a fixed length in the direction of width scanning and the like) are set as parameters for an image to be transmitted using facsimile communications protocols irrespective of the actual image to be transmitted. Further, in the sending end system, header information including an identifier identifying whether the information is code information or image information, and if it is image information, the image size, the line density (DPI), etc. are added to the head of the communication data to be transmitted. In the receiving end electronic filing system, without referring to the nominal parameters of the transmitting image, the identifier is decoded to determine whether the transmitted data is the code information or the image data. If the data is the image data, the image is reproduced based upon the remaining items of the header information. On the other hand, if the data is code information, it is reported to a higher layer. In this way, transferring the desirable information can be realized without being subjected to the restrictions of the facsimile communication protocol.

The above-mentioned data transfer is effected only in the case wherein the data is transmitted or received between the electronic filing systems. With respect to the cases where the sending end electronic filing system cannot determine whether the destination system is an electronic filing system or a facsimile apparatus, it is necessary to provide a device to determine whether the destination system is an electronic filing system or a facsimile apparatus, which will be hereinafter described.

In communication according to the facsimile communication protocols, the parameters of the sending and receiving end systems are transmitted to each other so that the respective function levels are set at the same level at both ends and that the communication functions become identical between the sending and receiving end systems (hereinafter, this operation is referred to as a negotiation). In the command which performs the negotiation, there is provided an area in which non-standardized terminal capability information is set. The sending or receiving end system can determine whether the counterpart is an electronic filing system or a facsimile apparatus through the negotiation by setting in this area code information indicating an electronic filing system, and the control information of that system. When the receiving end system turns out to be an electronic filing system, the processing of the sending end system is switched to a control mode peculiar to the electronic filing system so as to communicate with the other electronic filing system.

In the negotiation, if the code indicating of an electronic filing system is not included in the area, the electronic filing system determines that the other end system is a facsimile apparatus. Then, the electronic filing system sets up the communication with the facsimile apparatus according to the general facsimile communication protocol, or reject the communication.

As an another example for determining whether the destination system is an electronic filing system or not, it is possible to add the information implying the sending end system is an electronic filing system, the control information of the sending end system, or the like to a call command provided in the circuit connection procedures of the ISDN. According to the information, it is possible for the one end system to determine that the other end system is an electronic filing system. In the case where the sending end system is not an electronic filing system or is an electronic filing system without expected capabilities, the receiving end system does not connect lines and it sends back a data-reception-reject command and the cause of rejection to the sending end system. Further, when no electronic filing system code is added in the line connection response sent back from the receiving end system, the sending end system determines that the receiving end system is not an electronic filing system, thereby disconnecting the lines. In the manner as mentioned above, it is possible to determine whether or not the destination system is an electronic filing system or not prior to connecting the lines.

DETAILED DESCRIPTION OF THE PREFERRED EMBODIMENTS

Figure 1:
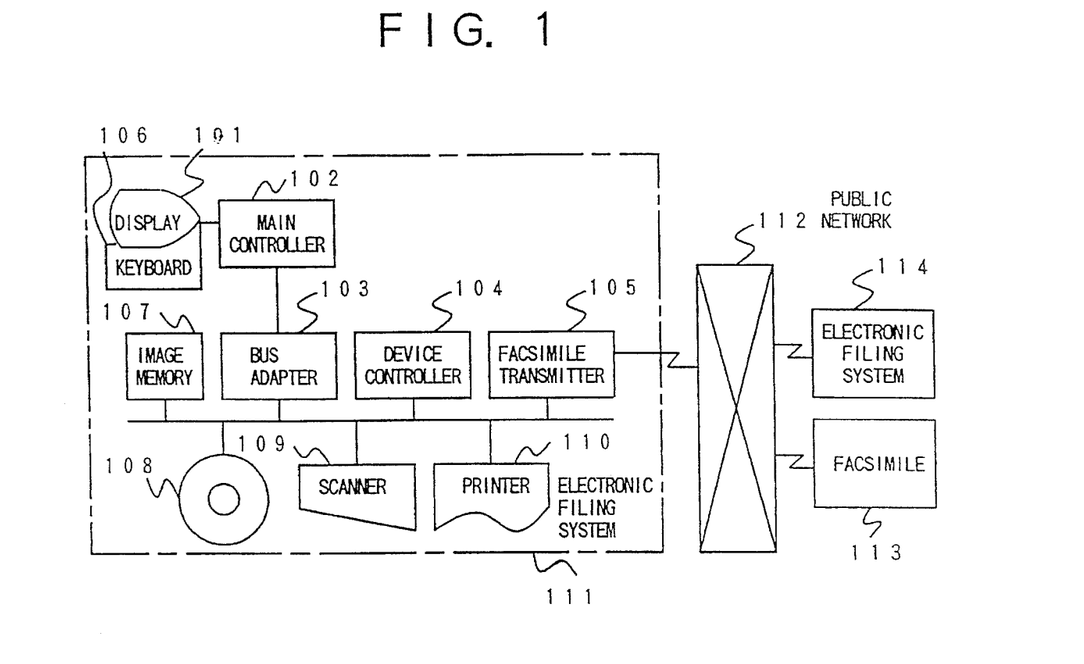
FIG. 1 is a block diagram showing the construction of a system for realizing an embodiment of the present invention.

Referring to FIG. 1 there is shown a structure of an electronic filing system according to the present invention in which data is transmitted or received according to facsimile communication protocols.

In FIG. 1, an electronic filing system 111 is connected to one end of a public network 112, and a plurality of G4 facsimiles 113 and electronic filing systems 114 are connected to the other end of public network 112.

The electronic filing system 111 includes a display 101, a main controller 102, a bus adopter 103, a device control unit 104, a facsimile transmitter 105, a keyboard 106, an image memory 107, an optical disk device 108, a scanner 109, a printer 110 and the like. In transmitting or receiving data, facsimile transmitter 105 is controlled by device controller 104 upon receipt of the instruction from main controller 102 to transmit the image stored in optical disk 108 or the like or to receive the image transmitted from electronic filing system 114 or G4 facsimile 113.

Figure 2:
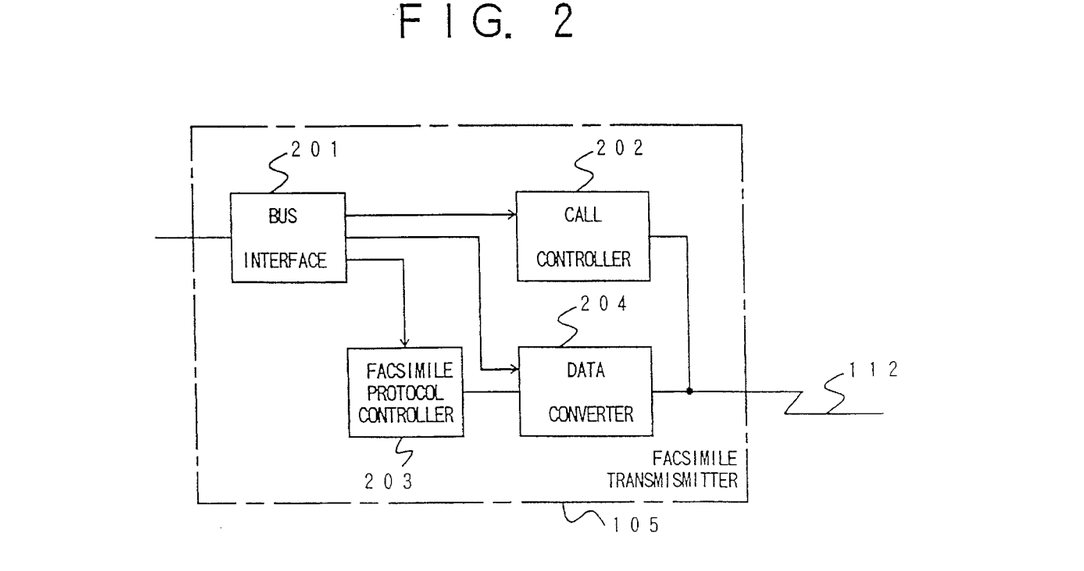
FIG. 2 is a schematic diagram showing the structure of the facsimile transmitter shown in FIG. 1.

As shown in FIG. 2, facsimile transmitter 105 comprises a bus interface section 201 which issues instructions to the other respective components in facsimile transmitter 105 upon receipt of an instruction from device controller 104, and a call controller 202 which makes a call with a dial number to public network 112. The facsimile transmitter 105 further includes a facsimile protocol control section 203 which controls a facsimile communication protocol for communication with electronic filing system 114 or the G4 facsimile 113, and a data conversion section 204 which converts the image data to be transmitted from bus data to serial data or converts the received image data from serial data to bus data.

Figure 3:
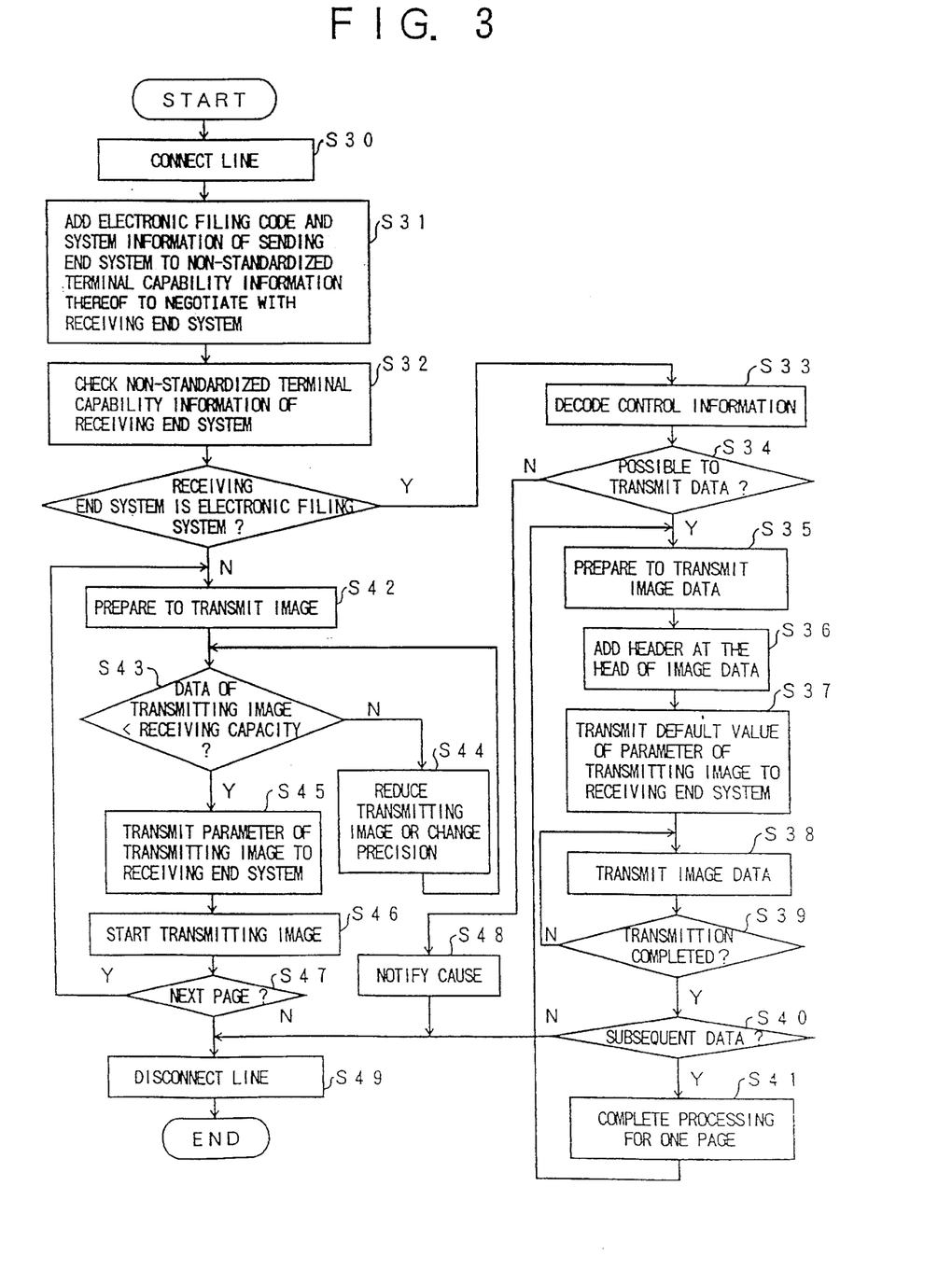
FIG. 3 is a flowchart showing a control flow of a sending end electronic filing system for realizing the embodiment of the present invention.
Figure 4:
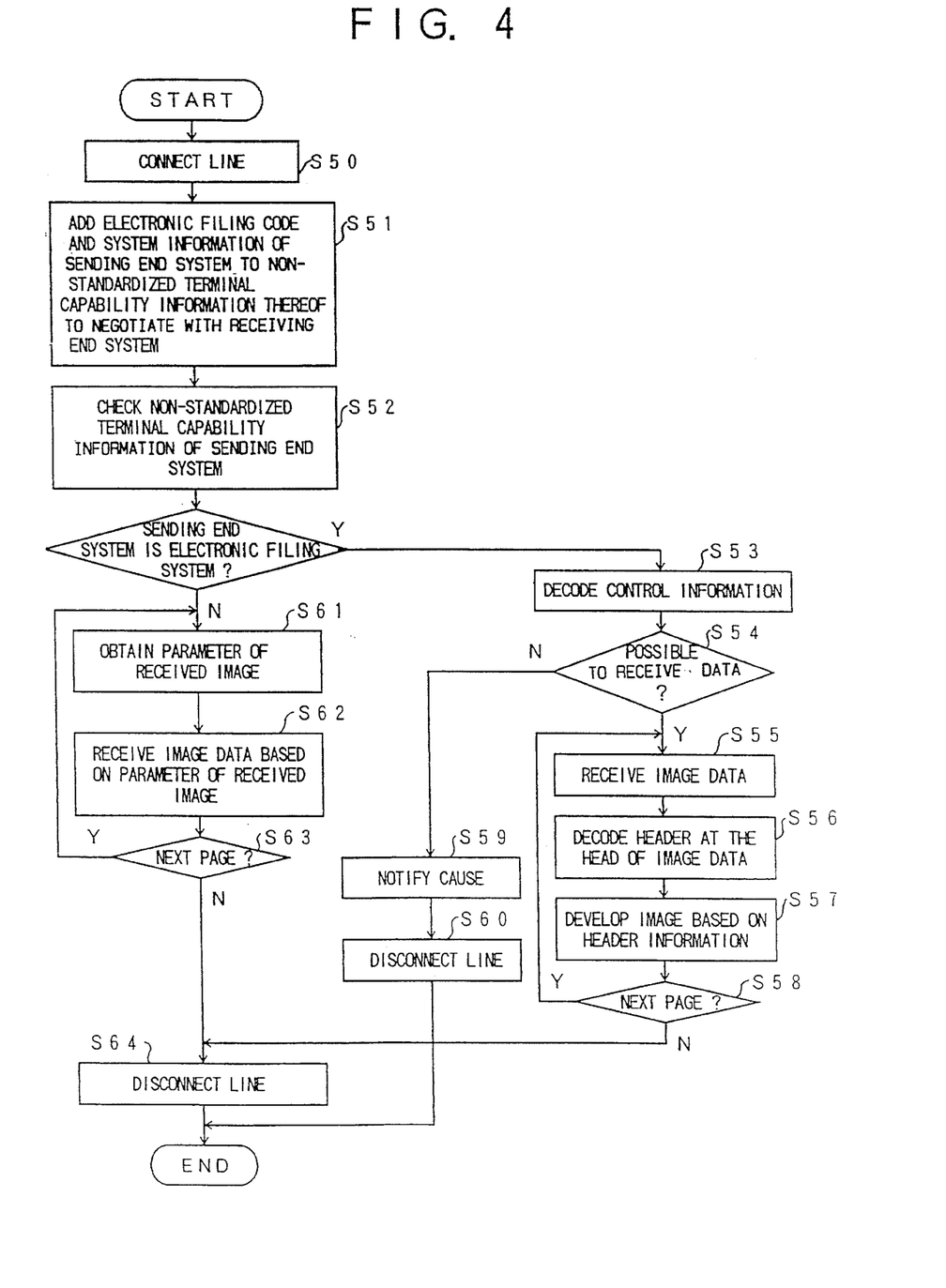
FIG. 4 is a flowchart showing a control flow of a receiving end electronic filing system.
Figure 5:
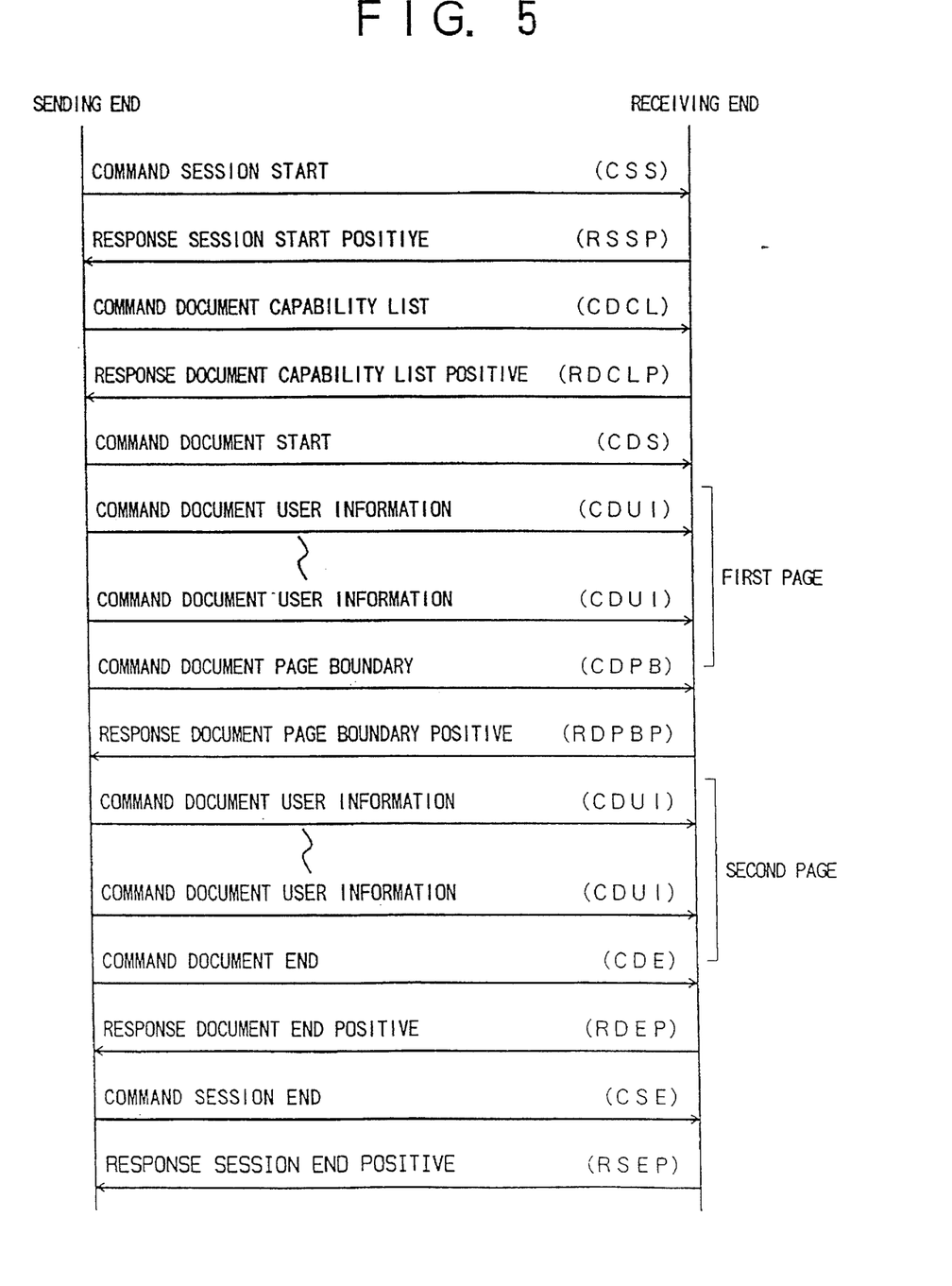
FIG. 5 is an explanatory view for a general facsimile communication protocol.

The operation of transmitting/receiving image data in the electronic filing system according to the present invention will now be described in connection with FIGS. 3 to 5. FIGS. 3 and 4 show control flows in transmitting or receiving image data, respectively, by means of the device controller 104 and the facsimile transmitter 105. FIG. 5 shows a general facsimile communication protocol T.62 bis.

Referring to FIG. 3, when transmitting data, the electronic filing system Ill initially is connected through lines with a destination apparatus (S30), issues a command session start (CSS in FIG. 5) according to the procedure stipulated in facsimile communication protocol T. 62 bis, and sends a subscriber number, a code, date and time information, etc. as parameters of the command session start (CSS). In this event, non-standardized terminal capability information optional to the parameter of the command session start (CSS) is added (S31). The non-standardized terminal capability information includes a specific code indicating that the sending end system is an electronic filing system, and the control information regarding the sending end system such its memory capacity, the image size capable of being treated, its optical disk capacity, system constitution, system revision, etc.

Figure 6:
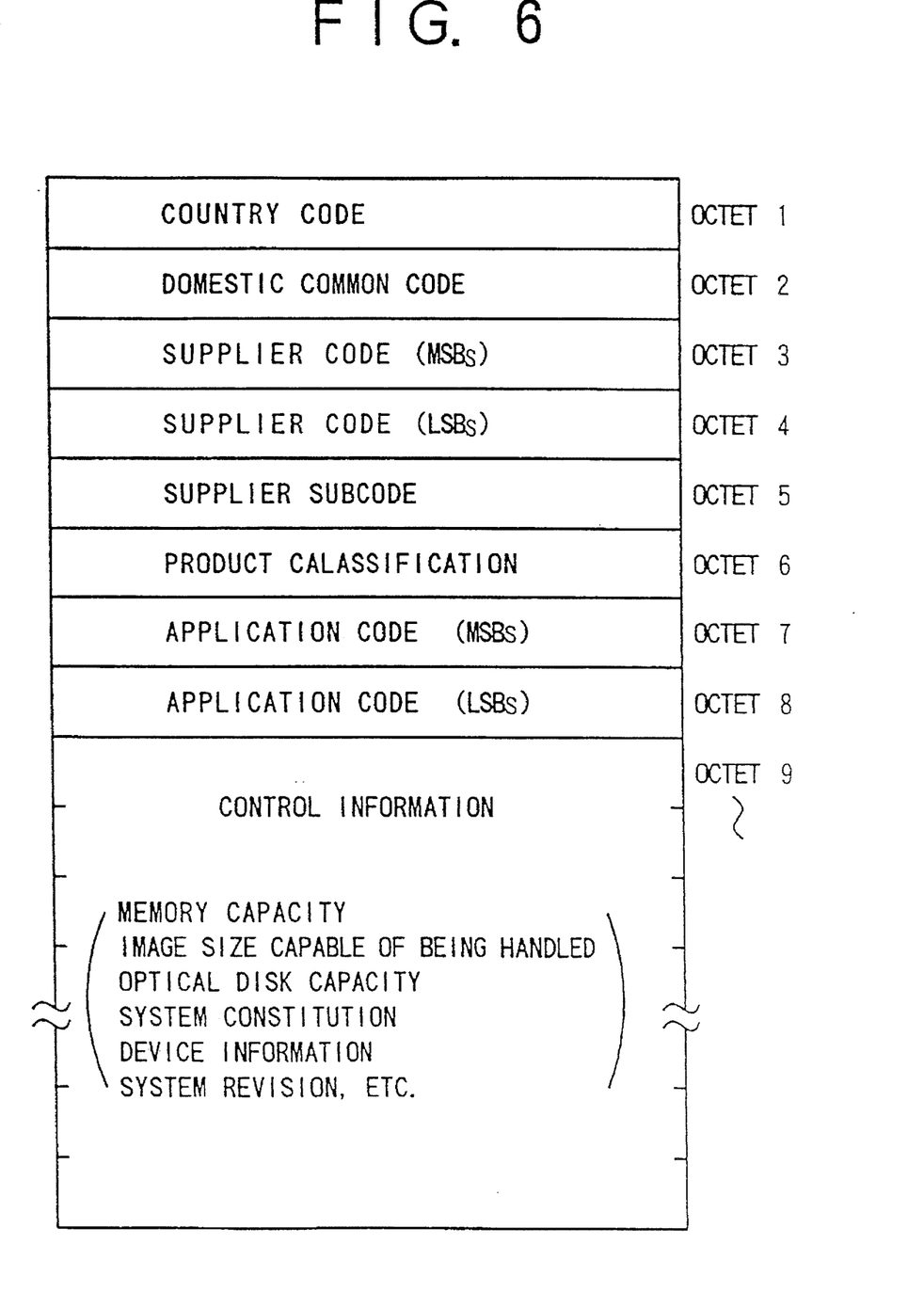
FIG. 6 shows a format of non-standardized terminal capability information.

A format of the non-standardized terminal capability information area is exemplified in FIG. 6. The information in octets 1 to 4 is defined in the CCITT recommendation and is peculiar and dependent on a supplier. Specific codes indicating that the sending end system is an electronic filing system are set in octets 5 and 6. In this example, a supplier subcode is set in octet 5 and a product classification is set in octet 6. The information indicating application functions or capabilities of the sending end system, i.e., FAX mode, expansion transfer mode, copy mode, etc., are set as application codes in octets 7 and 8. In octet 9 and the following octets, coded information regarding the memory capacity, the size of an image that the sending end system is capable of handling, the optical disk capacity, the constitution of the system, device information, the system revision, etc. are set as the control information of the system.

If the receiving end system is a G4 facsimile, then the non-standardized terminal capability information transmitted from the sending end electronic filing system is invalidated. The G4 facsimile sends back to the sending end electronic filing system the response session start positive (RSSP in FIG. 5) as a response to the CSS command. If the receiving end system is a similar electronic filing system, the non-standardized terminal capability information of the receiving end system is added to the RSSP command, so as to return the specific code indicating that the receiving end system is an electronic filing system similar, to the sending end system together with the control information of the receiving end electronic filing system.

Referring back to FIG. 3, the sending end electronic filing system can determine whether or not the receiving end system is an electronic filing system by checking the non-standard terminal capability information in octets 1 to 6 which is added to the response session start positive (RSSP) (S32). If the code other than the code indicating an electronic filing system is included in the response, or the non-standardized terminal capability information is not added to the response session start positive (RSSP), the sending end system recognizes that the receiving end system is a facsimile apparatus. Then the image is processed in the steps of S42 to S49 according to the usual facsimile procedure as follows. First, the image is prepared to be transmitted (S42); then it is determined whether the image exceeds a receiving capacity of the facsimile (S43). If the image does not exceed the capacity of the facsimile, the sending end system notifies the facsimile apparatus about the parameters of the image to be transmitted (S45), and then starts transmitting the image (S46). The processing steps S42 to S46 are repeated for every page to be transmitted (S47). When the transmission of the last page is completed, lines are disconnected (S49). On the other hand, if the transmitting image exceeds the receiving capacity of the facsimile apparatus, the image is first modified in order to satisfy the receiving capacity by compressing the image or lowering the line density. Processing step S45 is then performed.

Incidentally, when the receiving end system is a facsimile apparatus and an operator at the sending end electronic filing system requests an application for sending an image to an electrical filing system, the operator is informed that the receiving end system is a facsimile apparatus and may be asked for the next step.

On the other hand, when the sending end system recognizes that the receiving end system is an electronic filing system, the application code and the code information in octet 7 and the following octets in the RSSP sent from the receiving end system are decoded to determine whether or not the receiving end electronic filing system has the application capabilities requested by the sending end system (S33). If it is determined that the receiving end electronic filing system has no capabilities required, the sending end system and the operator are notified of the cause therefor (S48), and then lines are disconnected.

Figure 9:
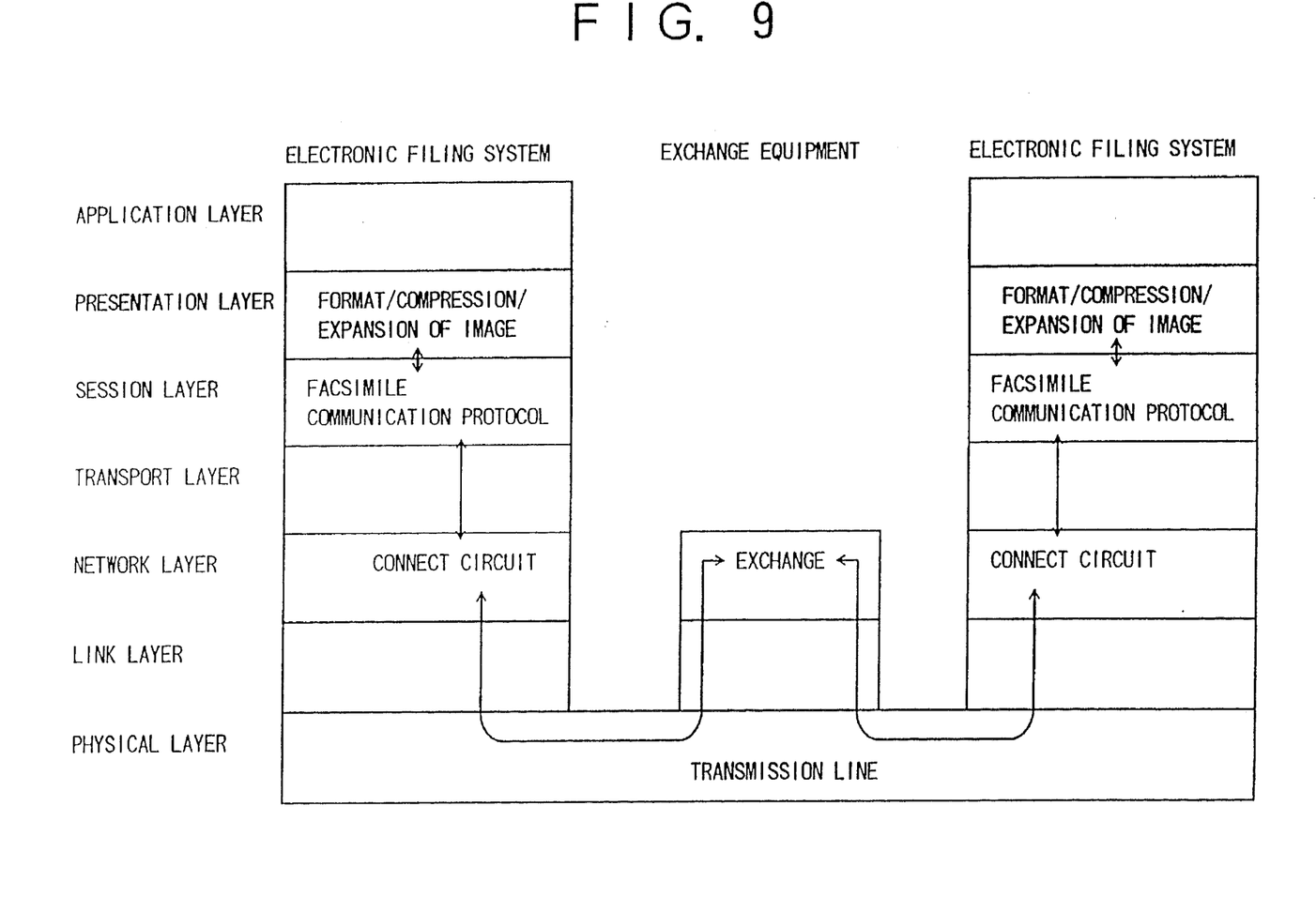
FIG. 9 is an explanatory view of an OSI reference model for explaining the embodiment of the present invention.

When it is determined in step S34 that the image can be transmitted to the receiving end electronic filing system, the size of the image or the like is defined, the image to be transmitted is compressed, and code information, etc. is prepared in the presentation layer of the OSI reference model shown in FIG. 9 (S35). At the head of the transmission data, header information is added which includes a peculiar identifier indicating the data classification, etc. of the transmission data (S36). The header information includes the identifier in octet 1 indicating whether the transmission data is code information or image information. In octet 2 and the following octets, if the transmission data is the code information, classification of the information (i.e., discrimination of massage, title, error information, etc.), code classification, length of valid data, control flag and the like are set. On the other hand, if the data corresponds to image information, the image classification (i.e., color or monochrome), the image size, the line density of the image, compression method and the like are set. The transmission data together with the header information are transferred to a lower layer, i.e., session layer as the image of the first page (S37). In the session layer, the transferred data is only recognized as image data, and accordingly, it is possible to send the data using facsimile communication protocol T.62 bis.

When the transmission data including the header information is prepared, a command document capability list (CDCL) is issued by the sending end electronic filing system as shown in FIG. 5. In response to this command, the receiving end electronic filing system sends back a response document capability list positive (RDCLP) to notify the sending end system of the receiving capability. Next, upon receipt of this, the sending end electronic filing system issues a command document start (CDS) and then a command document user information (CDUI) in which information such as the size and the line density of the image are notified within the range of the receiving capability which has been notified by the receiving end electronic filing system, and transmits the image transferred from higher layers (S38). In this event, since the transmitting image information carrying the command document user information (CDUI) is not used for developing (expanding) a received image in the receiving end system, the information formatted in fixed length of A4, 200 dpi, which corresponds to the default values in the G4 facsimile communication protocol, is used in order for it to be allowed in the G4 facsimile communication protocol. When the transmission for one page is completed (S39), it is examined whether remaining data is present or not (S40). If the remaining data is present, after the processing for one page is completed (S41), the processing returns to S34. If there is no remaining data, lines are disconnected (S49).

In the receiving end electronic filing system, as shown in a flowchart in FIG. 4, the lines are connected (S50), and the negotiation with the sending end electronic filing system is performed (S51). Then, the non-standardized terminal capability information of the command session start (CSS) sent from the sending end system, is checked (S52) to recognize whether or not the sending end system is an electronic filing system similar to the sending end system.

When it is determined in the receiving end electronic filing system that the sending end system is not an electronic filing system, the receiving processing steps S61 to S64 are executed in a conventional manner.

On the other hand, if the sending end system is found to be an electronic filing system, the transmitting image information which is included in the received command document user information (CDUI) is not referred to. Instead, it is determined whether it is possible to realize the application functions required by the sending end system by decoding the application code and control information and the like in the octet 7 and the following octets (S54). If the receiving end system is not capable to receive the image data to be transmitted, the cause of this incapability is informed to the operator (S59) at the sending end system, and the lines are disconnected (S60). When it is possible to receive the image, the image is received (S55), and the header located at the head of the image data are decoded (S56), thereby developing (expanding) the data according to the identifier added to the header (S57). These processing S55–S57 are repeated until the processing of the last page completed. When the image generation of the last page is completed, the lines are disconnected (S64).

By defining a single data transferring unit to be one page of the facsimile communication protocol as the above embodiment, a plurality of data transfers can be performed in succession in a single communication. Further, the rights for transferring and receiving data are inversed by using the session changing function of the facsimile communication protocol between pages, enabling bidirectional transfer of data.

With the successive steps as described, the transfer of images, data, etc. can be realized between electronic filing systems with the existing facsimile communication protocol in the communication mode peculiar to the electronic filing system.

As an example of the application according to the present invention, code information such as title information required for registering the received image, are transmitted as an image on the first page, and then, the image data is transmitted. Accordingly, the received image can be registered with the title information being given in the receiving end electronic filing system.

Further, it is also possible for the receiving end electronic filing system to transfer the received image to other electronic filing system connected with LAN or the like, after recognizing the content of the title information or the like transmitted from the sending end electronic filing system.

Figure 7:
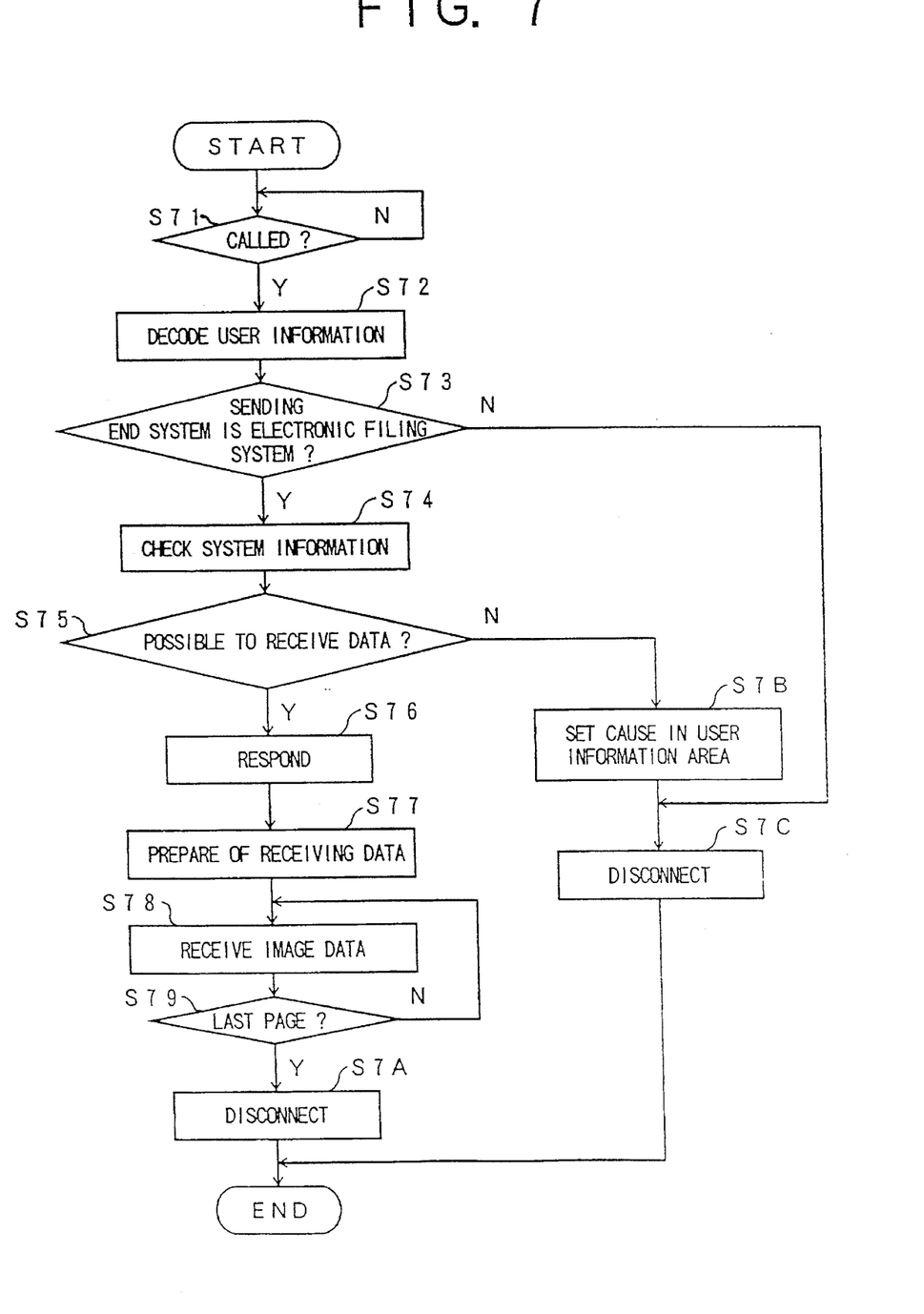
FIG. 7 is a flowchart showing a control flow in receiving data for realizing another embodiment of the present invention.
Figure 8:
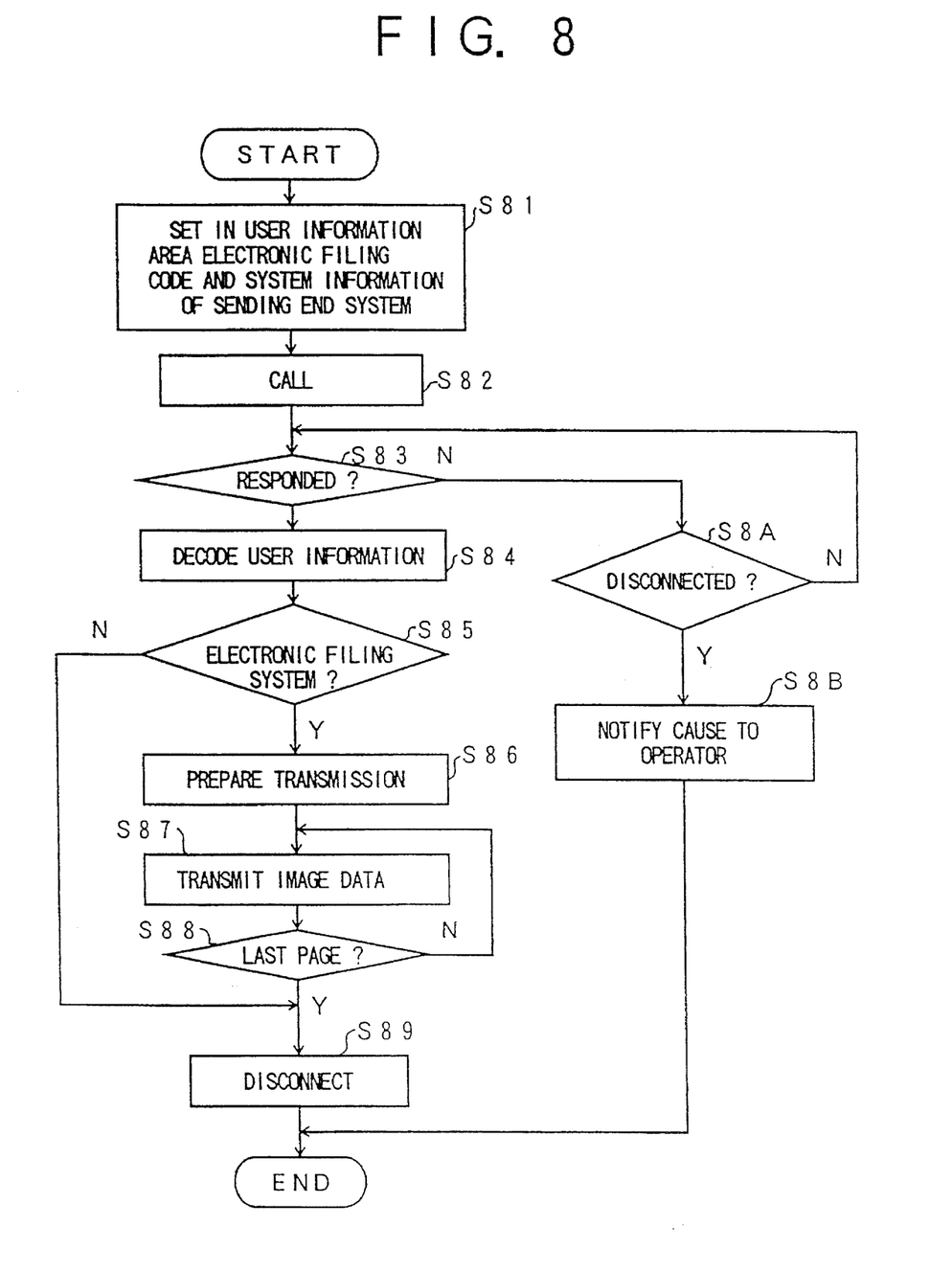
FIG. 8 is a flowchart showing the control flow in the transmission of data.

Another method for determining at the receiving end electronic filing system, when lines are connected, whether the sending end system is a facsimile or an electronic filing apparatus is now be described with reference to FIGS. 7 and 8. FIG. 7 and 8 show the control flows of the receiving end electronic filing apparatus and the sending end electronic filing apparatus, respectively.

The sending end electronic filing system first establishes the electronic filing system code and the control information thereof into the user information area of the command used for set up (S81), and make a call (S82). Being called (S71), the receiving end electronic filing system decodes the data in the user information area of CSS command sent from the sending system (S72). When there is no electronic filing system code in the user information area (S73N), the receiving end electronic filing system determines that the sending end system is a facsimile, so it does not connect line (S7C). On the other hand, when the sending end system is determined to be an electronic filing system (S73Y), the system information is checked (S74). If it is possible to receive the image (S75Y), the receiving end system establishes the electronic filing system code and the control information thereof in the user information area and sends them back to the sending end electronic filing system, and then connects the information channel (B channel) (S76). The sending end electronic filing system responds to this (S83Y) and connects the information channel. If it is not possible to receive the image by the receiving end electronic filing system in step S75, the cause for not being able to receive and the corresponding electronic filing system code are set in the user information area (S7B) and sent back to the sending end system, and the lines are disconnected (S70). In the sending end electronic filing system, when no response is sent back from the receiving end system in step 83 (S83N), the lines are disconnected (S8A), the cause for not receiving in the message sent back from the receiving end system is displayed (S89), and then the processing of transmitting the image data is terminated. In the case where the receiving end system is a facsimile apparatus, the electronic filing system code added into the user information area is ignored, and the response without the user information is sent back from the facsimile to the sending end electronic filing system. In responding this command, the sending end electronic filing system recognizes the user information area of this response command and determines that the receiving end system is not the electronic filing system, and then disconnects lines. If the receiving end system is an electronic filing system, after the information channels are connected, the image data are prepared to be transferred in the sending end system (S86). Then, the image data is transmitted page by page (S87). When the transmission of the last page is completed (S88Y), the lines are disconnected (S89). In the receiving end system, the corresponding procedures, i.e., preparation of receiving the image data (S77), the reception of the image (S78), the discrimination of the last page (S79), and the line disconnection (87A) are performed.

According to the present invention, between the electronic filing systems each having a facsimile transferring/receiving capability, the specific images such as large sized images, color images, and the code information, can be transferred in accordance with the facsimile communication protocol. Further, by determining whether or not the other end system is an electronic filing system, the electronic filing system can switch its own control accordingly. It is also possible for the receiving end electronic filing system to refuse the communication from a facsimile apparatus when the receiving end electronic filing system desires to make communication with an electronic filing system.

What is claimed is:

1. A method for transferring data between a source apparatus being an electronic filing system and a destination apparatus through a communications network according to facsimile communications protocol comprising the steps of:

sending from said source apparatus to said destination apparatus a first command in accordance with said facsimile communications protocol, said command including a first predetermined code indicating that said source apparatus is an electronic filing system, said command further including control information about said source apparatus;

determining by said source apparatus whether or not said destination apparatus is an electronic filing system according to whether or not a second command sent to said source apparatus from said destination apparatus in response to said first command includes a second predetermined code indicating that said destination apparatus is an electronic filing system and control information about said destination apparatus;

decoding by said source apparatus said control information about said destination apparatus contained in said second command, if said destination apparatus is an electronic filing system and said source apparatus receives said second command including said code indicating said destination apparatus being an electronic filing system and said control information about said destination apparatus;

preparing by said source apparatus said data to be transmitted to said destination apparatus according to said control information about said destination apparatus contained in said received second command;

adding by said source apparatus header information to the top of said data to be transmitted, said header information including at least an identifier identifying the type of said data to be transmitted;

notifying by said source apparatus to said destination apparatus parameters for transmitting image information in accordance with said facsimile communication protocol by a third command;

sending from said source apparatus said data to be transmitted together with said header information to said destination apparatus;

receiving by said destination apparatus said header information and said data sent from said source apparatus;

decoding by said destination apparatus said header information; and processing by said destination apparatus said received data in accordance with the decoded header information without referring to said parameters.

2. The method of claim 1 further comprising the steps of, if said destination apparatus is not an electronic filing system, notifying by said source apparatus to said destination apparatus appropriate parameters for transmitting image information according to said facsimile communications protocol by a command;

sending from said source apparatus said data to be transmitted to said destination apparatus in accordance with said protocol;

receiving by said destination apparatus said data sent from said source apparatus; and processing by said destination apparatus said received data according to said appropriate parameters.

3. The method of claim 1 wherein said identifier in said header information identifies whether the data to be transmitted is image data or code data, and an image in accordance with said received data is reproduced in said destination apparatus only when said identifier indicates that the transmitted data is image data.

4. The method of claim 3 wherein, if the data to be transmitted is image data, the header information further includes classification of said image, image size, line density of the image, and method of compression of the image data.

5. The method of claim 3 wherein, if the data to be transmitted is code data, the header information further includes classification of the code data.

6. The method of claim 1 wherein, if said destination apparatus is an electronic filing system and said source apparatus receives said second command including said code indicating said destination apparatus being an electronic filing system and said control information about said destination apparatus, said data is transmitted from said source apparatus to said destination apparatus in a page-by-page manner with each page having a predetermined capacity, and said header information is added at the top of the data for each page.

7. The method of claim 1 wherein said facsimile communications protocol is T. 62 bis.

8. The method of claim 1 wherein said first command in accordance with said facsimile communication protocol is a Command Session Start ("CSS") command, and said first predetermined code is contained in an area of said CSS command in which non-standardized terminal capability information is set.

9. The method of claim 8 wherein said second command in accordance with said facsimile communications protocol is a Response Session Start Positive ("RSSP") command, and said second predetermined code is contained in an area of said RSSP command in which non-standardized terminal capability information is set.

10. The method of claim 9 wherein said third command is a Command Document User Information ("CDUI") command in accordance with said facsimile communications protocol.

11. The method of claim 1 wherein, if said second predetermined code is not received by said source apparatus in response to said first predetermined code sent from said source apparatus to said destination apparatus, said destination apparatus is determined not to be an electronic filing system.

12. The method of claim 1 wherein said first command is a command for setting up and calling in accordance with said facsimile communications protocol, and said first predetermined code is contained in a user information area of said command.

13. The method of claim 12 wherein said second command is a command for responding to said first command in accordance with said facsimile communications protocol, and said second predetermined code is contained in a user information area of said second command.

14. An electronic filing system for transferring data to a destination apparatus through a communications network according to facsimile communications protocol comprising:

storage means for storing image information:

transmitting means for sending an image retrieved from said storage means through a communications network and according to said facsimile communications protocol;

means for sending to said destination apparatus a first command in accordance with said facsimile communications protocol, said first command including a first predetermined code indicating that said apparatus is an electronic filing system, said first command further including control information about said apparatus;

means for determining whether or not said destination apparatus is an electronic filing system, depending upon whether or not said destination apparatus sends back a second command in accordance with said facsimile communications protocol, said second command including a second predetermined code indicating that said destination apparatus is an electronic filing system and control information about said destination apparatus;

means for decoding, if said destination apparatus is an electronic filing system, said control information about said destination apparatus to determine whether or not said destination apparatus has the capabilities required by said apparatus;

means for preparing said data to be transmitted to said destination apparatus if said destination apparatus has capabilities required by said apparatus;

means for adding header information to the top of said data to be transmitted, said header information including at least an identifier identifying the type of said data to be transmitted;

means for notifying said destination apparatus either default parameters or appropriate parameters for transmitting image information in accordance with said facsimile communications protocol by a third command;

means for controlling the mode of data communication between said apparatus and said designation apparatus to be either a first control mode peculiar to said electronic filing system or a second control mode for facsimile machines depending upon whether or not said destination apparatus is an electronic filing system, whereby, in said first control mode, said data to be transmitted is sent together with said header information to said destination apparatus, and if said destination apparatus is an electronic filing system, it receives said data sent from said apparatus, decodes said header information, and processes the thus received data in accordance with the decoded header information without referring to said parameters, and in said second control mode, said data to be transmitted is sent to said destination apparatus, and if said destination apparatus is not an electronic filing system, it receives said data sent from said apparatus and processes the thus received data in accordance with either said default parameters or said appropriate parameters for transmitting image information in accordance with said facsimile communications protocol.

15. The system of claim 14 wherein said control information about said apparatus further includes at least one of the following: storage capacity of said storage means, image size that the apparatus is capable of handling, and system constitution of said apparatus.

16. The system of claim 14 wherein said identifier in said header information identifies whether the data to be transmitted is image data or code data.

17. The system of claim 16 wherein, if the data to be transmitted is image data, said header information further includes classification of said image, image size, line density of the image, and method of compression of said image data.

18. The method of claim 16 wherein, if the data to be transmitted is code data, said header information further includes classification of said code data.

19. The system of claim 14 wherein, if said destination apparatus is an electronic filing system and said source apparatus receives said second command including said code indicating said destination apparatus being an electronic filing system and said control information about said destination apparatus, said data is transmitted from said apparatus to said destination apparatus in a page-by-page manner with each page having a predetermined capacity, and said header information is added at the top of the data for each page.

20. The system of claim 14 wherein said facsimile communications protocol is T. 62 bis.

21. The system of claim 20 wherein said first command in accordance with said facsimile communication protocol is a Command Session Start ("CSS") command, and said first predetermined code is contained in an area of said CSS command in which non-standardized terminal capability information is set.

22. The system of claim 21 wherein said second command in accordance with said facsimile communication protocol is a Response Session Start Positive ("RSSP") command, and said second predetermined code is contained in an area of said RSSP command in which non-standardized terminal capability information is set.

23. The system of claim 22 wherein said third command is a Command Document User Information ("CDUI") command in accordance with said facsimile communications protocol.

24. The system of claim 14 wherein said first command is a command for setting up and calling in accordance with said facsimile communications protocol, and said first predetermined code is contained in a user information area of said command.

25. The system of claim 24 wherein said second command is a command for responding to said first command in accordance with said facsimile communications protocol, and said second predetermined code is contained in a user information area of said second command.

* * * * *